United States Patent
Katoh et al.

(10) Patent No.: US 7,584,510 B2
(45) Date of Patent: Sep. 1, 2009

(54) NETWORK SERVICE PROCESSING METHOD AND SYSTEM

(75) Inventors: Masafumi Katoh, Kawasaki (JP); Akihiro Inomata, Kawasaki (JP); Tetsuya Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 829 days.

(21) Appl. No.: 11/088,983

(22) Filed: Mar. 24, 2005

(65) Prior Publication Data

US 2006/0130152 A1    Jun. 15, 2006

(30) Foreign Application Priority Data

Dec. 10, 2004 (JP) .............................. 2004-358042

(51) Int. Cl.
*H04L 9/32*    (2006.01)
(52) U.S. Cl. ........................ 726/29; 726/6; 713/168; 709/203; 709/219; 709/221; 709/223
(58) Field of Classification Search ................ 713/168; 726/6, 29; 709/223, 203, 219, 221
See application file for complete search history.

(56) References Cited

U.S. PATENT DOCUMENTS

| | | | | |
|---|---|---|---|---|
| 5,347,632 | A * | 9/1994 | Filepp et al. | 709/202 |
| 5,815,661 | A * | 9/1998 | Gosling | 709/216 |
| 6,789,114 | B1 * | 9/2004 | Garg et al. | 709/224 |
| 2002/0073145 | A1 * | 6/2002 | Shimoji | 709/203 |
| 2003/0061323 | A1 * | 3/2003 | East et al. | 709/223 |
| 2006/0075080 | A1 * | 4/2006 | Burr et al. | 709/223 |

FOREIGN PATENT DOCUMENTS

| | | |
|---|---|---|
| JP | 2000-236326 | 8/2000 |
| JP | 2000-347958 | 12/2000 |

* cited by examiner

*Primary Examiner*—Tongoc Tran
(74) *Attorney, Agent, or Firm*—Fujitsu Patent Center

(57) ABSTRACT

This invention is to enable to provide a network service, flexibly and quickly. In an embodiment of the invention, a network platform is achieved by a service providing network. The network platform provides common functions such as authentication and authorization, billing, and client management, and individual functions such as session control for client terminals connected with the service providing network. The client terminal generates and registers a service program to utilize functions in the network platform via a network management interface SMI. Then, by executing the service program, a service request for a specific function is transmitted to the network platform through a service control interface SCI, and the execution result is received from the specific function in the network platform.

16 Claims, 14 Drawing Sheets

| CLIENT ID | FUNCTION MODULE ID |
|---|---|
| ABC | F1111 |
| ABC | F1112 |
| ⋮ | ⋮ |

FIG.6

| CLIENT ID | SERVICE ID |
|---|---|
| ABC | S1111 |
| ABC | S1112 |
| ⋮ | ⋮ |

FIG.7

| FIG.15A | PACKET HEADER | #531 | #936 | #0703 | ACTIVATE FUNCTION #c |

| FIG.15B | PACKET HEADER | #531 | #936 | #0703 | EXECUTION RESULT OF FUNCTION #c : STATE #Y |

| FIG.15C | PACKET HEADER | #531 | #936 | #0703 | ACTIVATE FUNCTION #b |

| FIG.15D | PACKET HEADER | #531 | #936 | #0703 | EXECUTION RESULT OF FUNCTION #b |

NETWORK SERVICE PROCESSING METHOD AND SYSTEM

TECHNICAL FIELD OF THE INVENTION

This invention relates to a technique to provide a network service.

BACKGROUND OF THE INVENTION

There is a service, which allows plural users to use applications prepared on a server connected to the Internet. In such a service, the way to combine programs on the server (the way to use when viewed from the user) is previously determined by a provider of the service, and the user cannot freely combine the plural programs on the server to use them.

For example, JP-A-2000-236326 discloses a technique not to require the maintenance of the software, and not to require controls or the like relating to the activation of the software at a time when the intercommunication service is utilized. Specifically, clients are defined as thin client terminals having minimum modules for server accesses and personal authentication, and servers are defined as a managing server having a common middleware necessary for operations of the thin client terminal, an application software and a management program to manage those, and an authentication server to carry out the personal authentication with the thin client terminals. Each of the thin client terminals downloads necessary software from the management server when the power supply is turned on and when the service is utilized. Only by downloading necessary programs to the client, various services cannot be provided.

In addition, for example, JP-A-2000-347958 discloses a technique to reduce the data communication amount and to save a used capacity of a computer memory. Specifically, a server stores programs to be provided for clients in a form in which the programs are divided into respective functions. Therefore, the clients can select programs stored in the form in which the programs are divided into respective functions by each necessary function. Then, only the selected programs are provided for the client from the server. By this configuration, it is possible to select and download only a print control program concerning the necessary functions to the client. Accordingly, it is possible to reduce the data communication amount from the server to the client, and to save the used capacity of the computer memory. This technique is not characterized in a combination of programs defined by the client.

Furthermore, US-2002-0073145-A discloses a technique to download programs with a small amount of data to a client terminal from a server to cause the programs to execute a desired data processing. Specifically, definition information is inputted by the client terminal, the server reads out setting information corresponding to the definition information and transmits it to the client terminal, and one or plural functional parts are called on the basis of the setting information. The functional part is such that plural data processings are divided into common unit processings, and a processing logic extracted from those is described. The client terminal or the processing server dynamically generates a unit processing program by the processing logic based on one or plural functional parts, and executes the one or plural generated unit processing programs in accordance with conditions based on the setting information. In this technique, there is no viewpoint such as authorization of the unit processing program. Besides, there is no disclosure on a problem in a case where plural kinds of unit processing programs are executed.

In the related art as described above, when the client side combines arbitrary functions prepared on the server side and the client side receives, through a network, the provision of a specific service realized by the combination of the functions, consideration is not given to the judgment as to whether or not the service can be provided, and the discrimination between plural kinds of combinations. Accordingly, in the related art, there is a problem in the flexible and suitable provision of the network service.

SUMMARY OF THE INVENTION

An object of the present invention is therefore to provide a novel technique to enable the flexible and suitable provision of a network service.

A service processing method according to a first aspect of the invention comprises: receiving from a client terminal executing a service program that is defined by a client side for a combination of functions authorized for the client side, among functions provided by a network platform side, and whose identification information is registered in the network platform side, a message including identification information of a service program, identification information of a client, and designation of a requested operation for a specific function; referring to a data storage storing the identification information of the service program in association with the identification information of the client to confirm whether or not a combination of the identification information of the service program and the identification information of the client, which is included in the received message, has been registered in the data storage; and if the confirmation in the referring is affirmative, carrying out a processing requested in the message by the specific function in the network platform side, and transmitting a response including a processing result and the identification information of the service program to the client terminal.

As stated above, because the identification information of the service program is included in the message (i.e. a service request), it is possible for the network platform side to confirm whether or not the response to the message is allowable, and to proceed the processing while identifying the individual service program, even if the plural service programs are executed in the client terminal. Incidentally, it is also possible to confirm whether or not the use of the specific function is allowable, using elements other than the identification information of the service program.

In addition, the service processing method according to the first aspect of the invention may further comprise: receiving from the client terminal, a service program registration request including a service program that has not been registered in the network platform side, and the identification information of the client; analyzing the received service program to judge whether or not all functions to be used in the received service program are authorized for the client; if it is judged that all functions to be used in the received service program are authorized for the client, storing identification information issued for the received service program in association with the identification information of the client; and transmitting a registration completion notice including the identification information of the service program to the client terminal.

Thus, because it is confirmed in advance that all functions defined in the service program are authorized for the client, it becomes possible to check the service program by using the identification information of the service program at a time when the service program is executed.

Furthermore, the aforementioned analyzing may comprise searching a client data storage storing identification information of an authorized function in association with the identification information of the client by using the identification information of the client, which is included in the service program registration request, and judging whether or not all functions to be used in the received service program can be extracted from the client data storage. As a result, it becomes possible to easily confirm the service program.

An information processing method according to a second aspect of the invention comprises: receiving a service program registration request including a service program in which a combination of functions used by a client is defined among functions provided by a network platform side, and identification information of the client; analyzing the received service program to judge whether or not all functions to be used in the received service program are authorized for the client; if it is judged that all functions to be used in the received service program are authorized for the client, storing identification information issued for the received service program in association with the identification information of the client; and transmitting a registration completion notice including the identification information of the service program to the client terminal. By carrying out such a processing, it becomes possible to automatically check the service program.

It is possible to create a program for causing a computer to carry out the methods of the invention and a program to realize the wireless communication portable terminal, and the programs are stored in a storage medium or a storage device such as, for example, a flexible disk, a CD-ROM, a magneto-optical disk, a semiconductor memory, or a hard disk. Besides, the program may be distributed in digital signals through a network. Incidentally, the intermediate data in the processing is temporarily stored in a storage device such as a memory of a computer.

BRIEF DESCRIPTION OF THE DRAWINGS

FIG. 6 is a diagram showing an example of data stored in a client data storage;

FIG. 7 is a diagram showing an example of data stored in the client data storage;

FIGS. 15A to 15D are diagrams showing examples of data transmitted at the time when the service is used through the SCI;

DETAILED DESCRIPTION OF THE PREFERRED EMBODIMENTS

Figure 1:
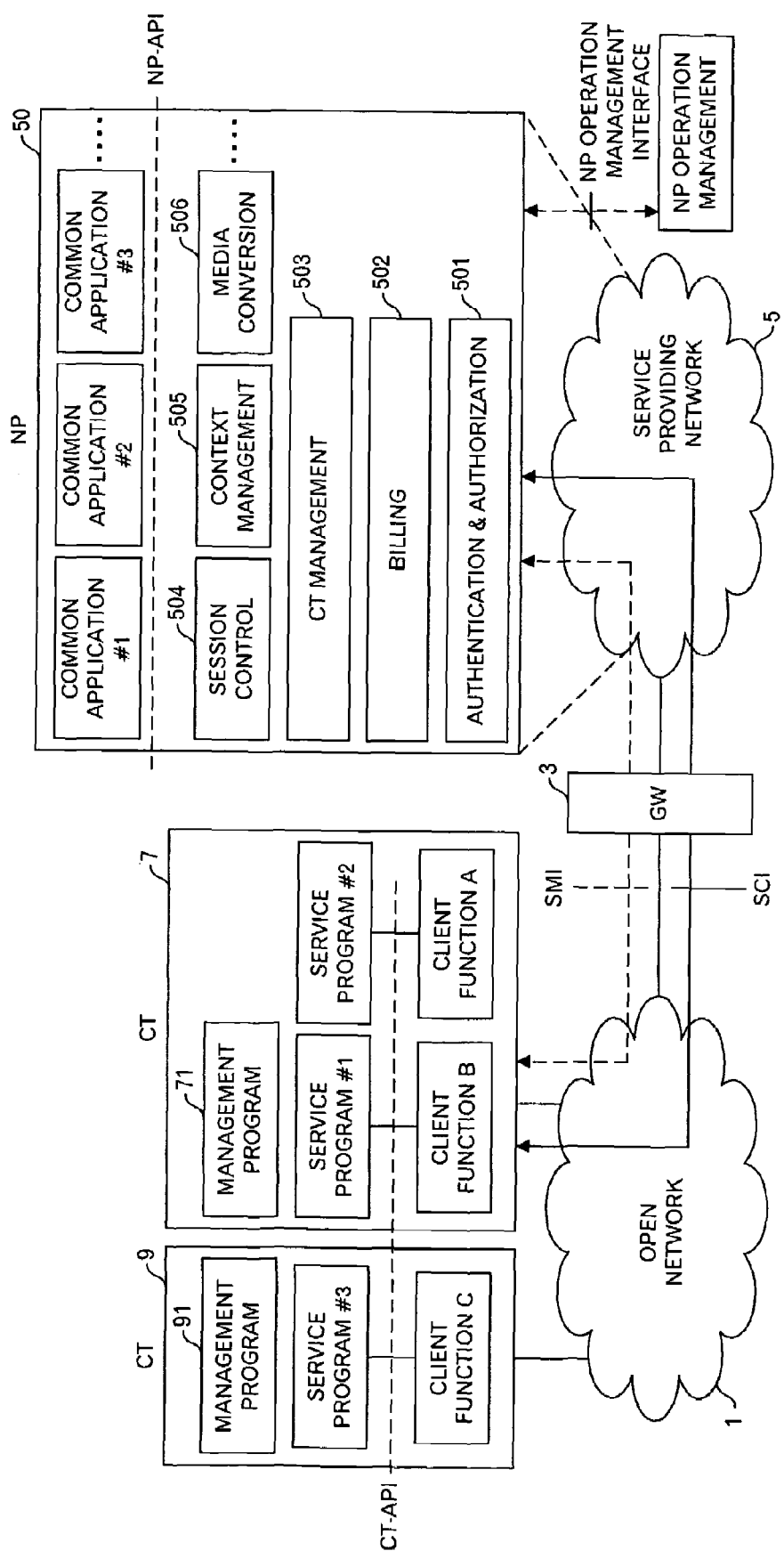
FIG. 1 is a block diagram of an embodiment of the invention.

FIG. 1 is a schematic diagram of a system according to an embodiment of the invention. Plural client terminals (CT: Client Terminal) are connected to an open network 1 such as the Internet. The open network 1 is connected to a service providing network 5 through a gateway (GW: Gateway) 3. In the service providing network 5, a network platform (NP) 50 described below is constructed.

In the network platform 50, as common function modules, there are provided an authentication & authorization function module 501, a billing function module 502, and a CT management function module 503. The authentication & authorization function module 501 performs client authentication, terminal authentication, service authorization and the like. The billing function module 502 collects data necessary for billing, such as the number of times of use of function modules, for example, for each client, and generates billing data, for example, for each client. The CT management function module 503 performs version management for each function module, state management of the client terminal, download control of function modules to the client terminal, registration confirmation of service programs described below, issuance of a service ID and the like.

Besides, the network platform 50 is provided with individual function modules such as a session control function module 504 for performing session control (for example, SIP (Session Initiation Protocol)), a context management function module 505 for managing presence data of clients, and a media conversion function module 506. In FIG. 1, although the three individual function modules are shown, there is also a case where other function modules are provided. Further, the network platform 50 is also provided with common applications #1, #2, #3 and the like commonly used by the individual function modules.

On the other hand, the client terminal is provided with one or plural service programs, one or plural client function modules, and a management program. In the example of FIG. 1, a client terminal 7 is provided with service programs #1 and #2, client function modules A and B, and a management program 71. With respect to the client function module, there is also a case where it is the function module downloaded from the network platform 50, or there is also a case where it is the function module previously prepared in the client terminal. Besides, a client terminal 9 is provided with a service program #3, a client function module C, and a management program 91.

Further, in the network platform 50, an NP-API (Application Program Interface) is defined between the common applications and the individual function modules. Besides, in the client terminal, a CT-API is defined between the service programs and the client function modules. For example, in the client terminal, the service program uses the function module of the client through the CT-API. Further, a service management interface (SMI: Service Management Interface) and a service control interface (SCI: Service Control Interface) are defined between the client terminals and the network platform 50. The service program is defined such that a service desired by the user of the client terminal is provided through the SCI from the network platform 50.

Next, the service management interface SMI will be described. The network platform 50 opens the function modules in the network platform 50 and parameters necessary for execution of the function modules to the public through the SMI. The user of the client terminal or a vendor of the client system acquires necessary information from the network platform 50 through the SMI and performs service program generation.

Figure 2A:
FIG. 2A is a diagram showing a standard packet in SMI.
Figure 2B:
FIG. 2B is a diagram showing a standard packet in SCI.

The format of a packet exchanged through the SMI is, for example, as shown in FIG. 2A. That is, the packet includes a packet header including a network address such as an IP address, a client ID, a terminal ID, and operation data. With respect to the packet from the client terminal, the operation data includes, for example, service request contents (service program registration request, function download request, version management request, state management request, etc.). With respect to the packet from the network platform 50, the operation data includes, for example, processing results and/or requested data. Besides, the format of the packet exchanged through the SCI is, for example, as shown in FIG. 2B. That is, the packet includes a packet header including a network address such as an IP address, a client ID, a terminal ID, a service ID as a service program ID, and operation data. With respect to the packet from the client terminal, the operation data includes, for example, an ID of a function module to be activated and necessary parameters. With respect to the packet from the network platform 50, the operation data includes, for example, processing results.

Besides, an NP operation management function is also prepared in the service providing network 5, and various managements concerning the network platform 50 are performed by the NP operation management function through an NP operation management interface. Incidentally, since the NP operation management function is not the main part of this embodiment, a further description will not be made.

The processing at the time of generation of the service program will be described with reference to FIGS. 3 to 7. For example, the management program 71 in the client terminal 7 transmits a service program generation request to the network platform 50 through the SMI (step S1). The CT management function module 503 of the network platform 50 receives the service program generation request from the client terminal 7 (step S3), and transmits service program generation element data to the client terminal 7 through the SM1 (step S5). The management program 71 in the client terminal 7 receives the service program generation element data from the network platform 50 (step S7), and uses the service program generation element data to display a service program generation screen (step S9). For example, a screen as shown in FIG. 4 is displayed. In the example of FIG. 4, a service program development window and a template window for logic of the service program are displayed. The service program development window includes a list of function modules open to the public in the network platform 50. Here, items such as SIP, RSVP (Resource Reservation Setup Protocol)-TE (Traffic Engineering), context management, RFID (Radio Frequency-ID) middle, and media conversion are listed. When each item is clicked, the function outline of the function module relating to the item and input parameter information are displayed. Incidentally, FIG. 4 shows a case where the SIP is selected, and the function outline and the input parameters may be displayed on a pop-up window or the like. On the template window, a typical processing logic can be selected, and FIG. 4 shows an example of such logic that a certain processing is performed at the first stage, a condition is judged at the second stage, and different processings are performed at the third stage according to the condition. While referring to the contents displayed on the service program development window, the user of the client terminal 7 causes a logic, which is consistent with a service program to be generated this time, to be displayed on the template window, and inputs processings to be carried out in the respective blocks, IDs of function modules to be used, and necessary parameters.

Incidentally, the management program 71 in the client terminal 7 confirms whether a necessary function module exists in the client terminal 7 (step S11). In the case where it is judged that the necessary function module do not exist in the client terminal 7, it transmits a function module request for the necessary function module to the network platform 50 through the SMI (step S13). The CT management function module 503 of the network platform 50 receives the function module request from the client terminal 7 (step S15). There is also a case where from the client ID included in packets of the received function module request, the CT management function module 503 of the network platform 50 judges whether or not the function module relating to the request can be transmitted. However, when the function module is a basic function module necessary to use the network platform 50, it is not necessary to particularly carry out a check. The CT management function module 503 reads out the function module relating to the request from the function module storage 511, and transmits it to the client terminal 7 through the SMI (step S17). When receiving the requested function module from the network platform 50, the management program 71 in the client terminal 7 stores it into the storage device of the client terminal (step S19).

In the case where it is judged at the step S11 that the necessary function module exists in the client terminal 7, or after the step S19, the management program 71 in the client terminal 7 accepts a service program generation instruction from the user on the screen shown in, for example, FIG. 6 (step S21). A set of IDs of function modules authorized in the network platform 50 and necessary input parameters is designated in the blocks of the template representing the logic, and data such as conditions necessary for the logic is also designated. The processing proceeds to a processing of FIG. 5 through a terminal A.

Then, the management program 71 in the client terminal 7 generates a service program in accordance with the accepted input data, and stores it into the storage device (step S23). The management program 71 transmits a service program registration request including the service program to the network platform 50 (step S25). The CT management function module 503 in the network platform 50 receives the service program registration request including the service program from the client terminal 7, and stores it into the storage device (step S27). Then, the CT management function module 503 refers to a client data storage 513, and carries out a check processing to the received service program (step S29). For example, data as shown in FIG. 6 is stored in the client data storage 513. In the example of FIG. 6, an ID of an authorized function module is registered correspondingly to a client ID. There is also a case where instead of such a simple table, a table defining sections to which the clients belongs is combined with a corresponding table associating the sections with IDs of authorized function modules. The CT management function module 503 uses the client ID included in the service program registration request to search the table as shown in FIG. 6, identifies the IDs of the authorized function modules, and judges whether all function modules defined in the service program can be used, that is, whether the use of the service program can be authorized (step S31). In the case where an unauthorized function module is defined in the service program, the CT management function module 503 transmits a registration rejection notice to the client terminal 7. The management program 71 in the client terminal 7 receives the registration rejection notice from the network platform 50, and displays it on the display device (step S33). By this processing, it is possible to recognize that there is a problem in the generated service program.

On the other hand, in the case where it is judged that all the function modules defined in the service program received from the client terminal 7 can be used, the CT management function module 503 issues the service ID to the service program, and registers it into the client data storage 513 (step S35). For example, as shown in FIG. 7, the service ID is registered so as to correspond to the client ID. Incidentally, the service program itself or an ID group of all defined function modules may be made to correspond to client IDs and may be registered into the client data storage 513 or another data storage for an authentication and authorization processing. With respect to the service ID, there is a case where the service ID is unique in the network platform 50, or there is a case where it is unique for each client or each client set, and either system can be adopted. In the case of the former, it is necessary to issue and manage the service ID in the network platform side. In the latter, the service ID is issued and managed for each client ID, and the service program is identified by combining both IDs. In such a case, because it is possible to issue the service ID in the client side, and to register it into the network platform side, it can be said that the latter makes the distributed management of the service ID easier. Then, the CT management function module 503 transmits a registration completion notice including the issued service ID to the client terminal 7 via SMI (step S37).

The management program 71 in the client terminal 7 receives the registration completion notice including the service ID, and stores the service program and the received service ID as an authorized service program into a storage device of the client terminal 7 (step S39). As a result, when the service is requested to the network platform 50 through the SCI, the packet as shown in FIG. 2B can be generated and transmitted, and the service defined in the service program customized by the user can be received from the network platform 50.

Figure 3:
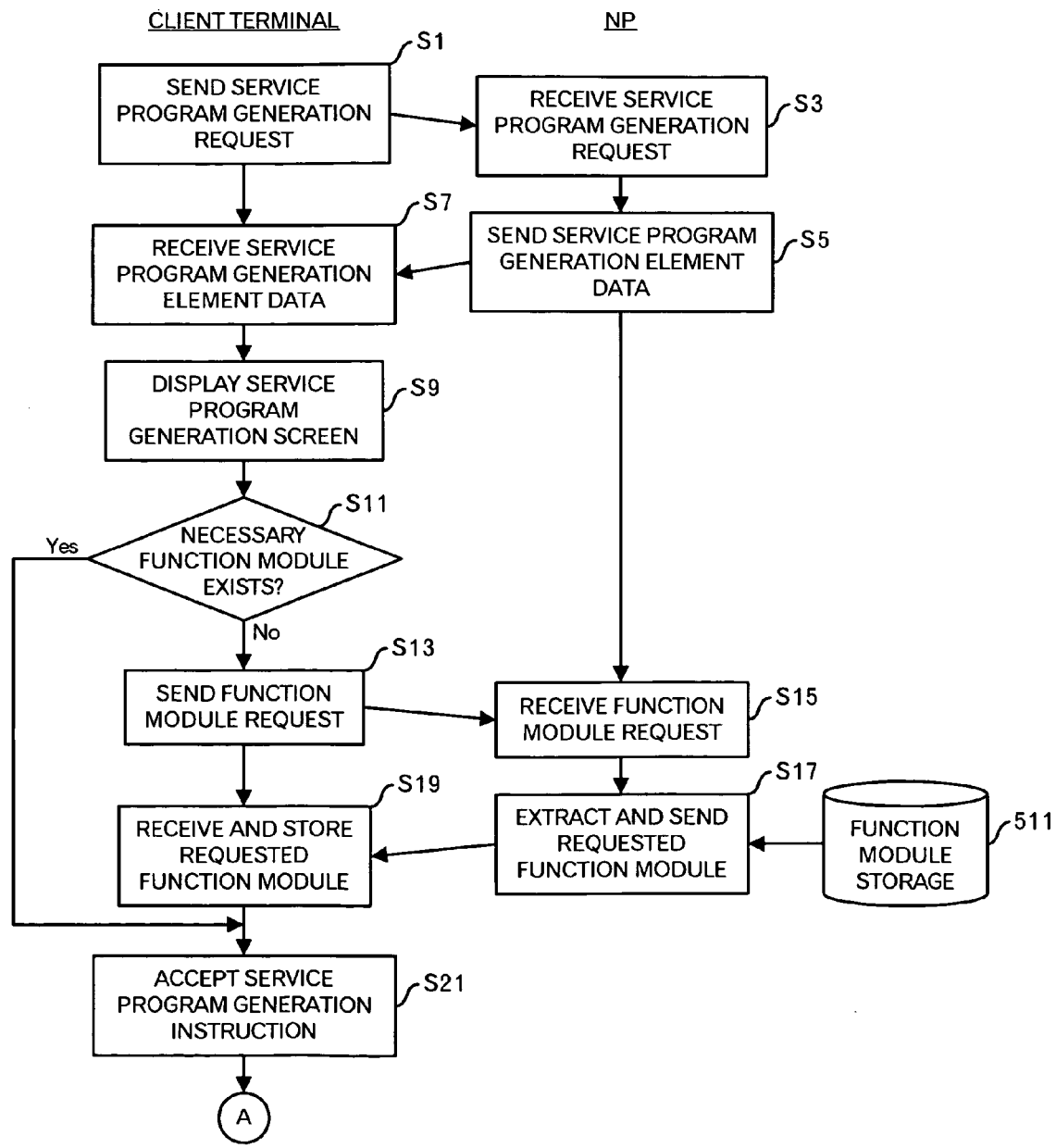
FIG. 3 is a diagram showing a processing flow of a service program registration processing.
Figure 4:
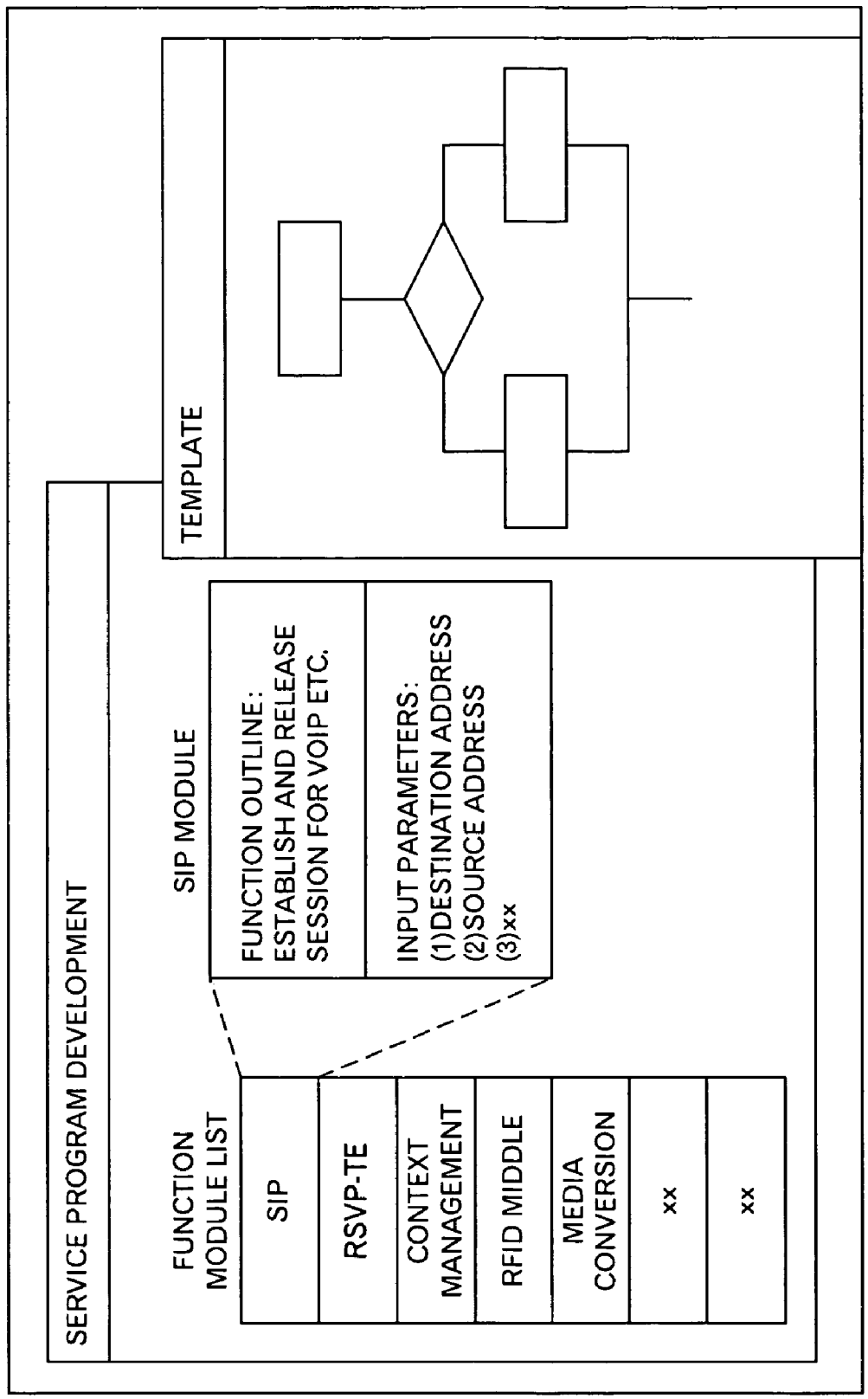
FIG. 4 is a diagram showing an example of a screen displayed on a client terminal at a time of service program generation.
Figure 5:
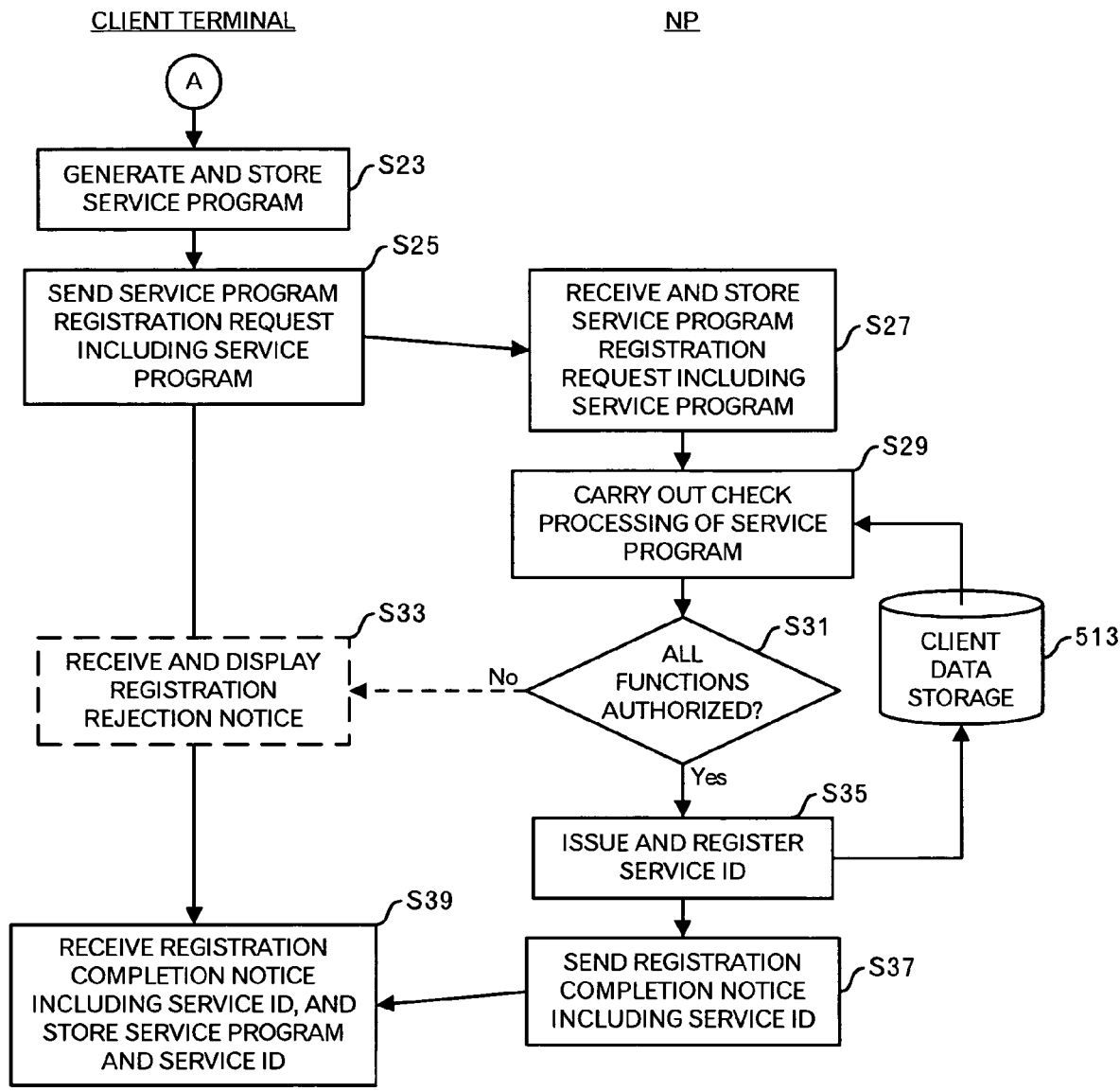
FIG. 5 is a diagram showing a processing flow of the service program registration processing after FIG. 3.

Incidentally, in the processing flow of FIGS. 3 and 5, the function module for the client terminal is downloaded at the steps S11 to S19 if necessary. However, for example, after the client terminal receives the registration completion notice, the function module necessary for execution of the service program may be further downloaded. Besides, it is possible that the steps S11 to S19 are not carried out, and the function module necessary for execution of the service program is downloaded after the registration completion notice is received.

Figure 8B:
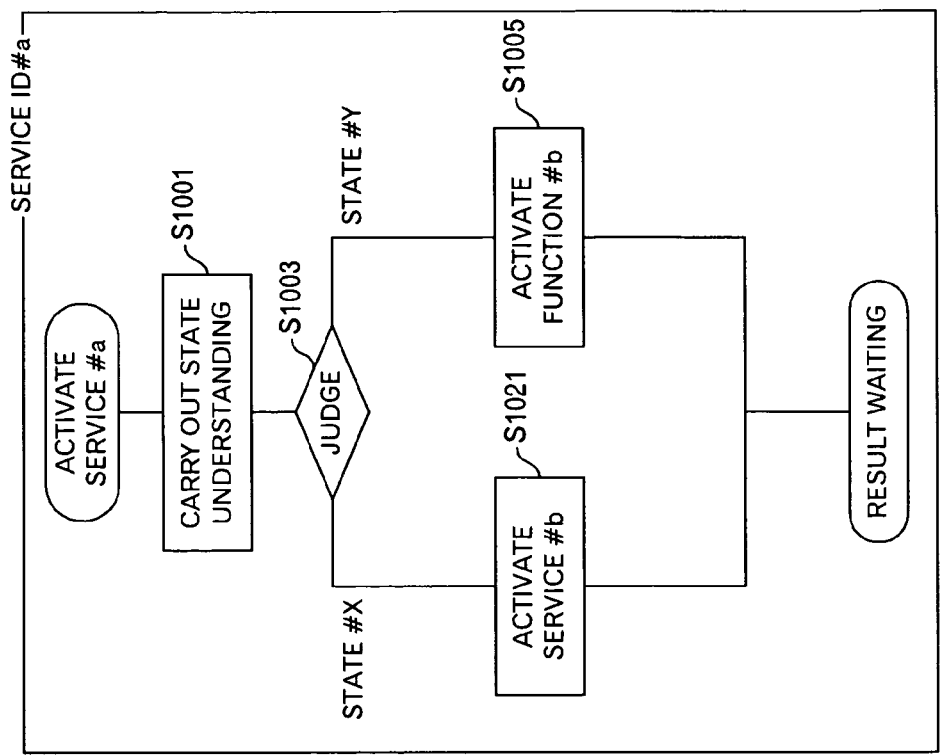
FIGS. 8A and 8B are diagrams showing examples of the service programs.
Figure 8A:
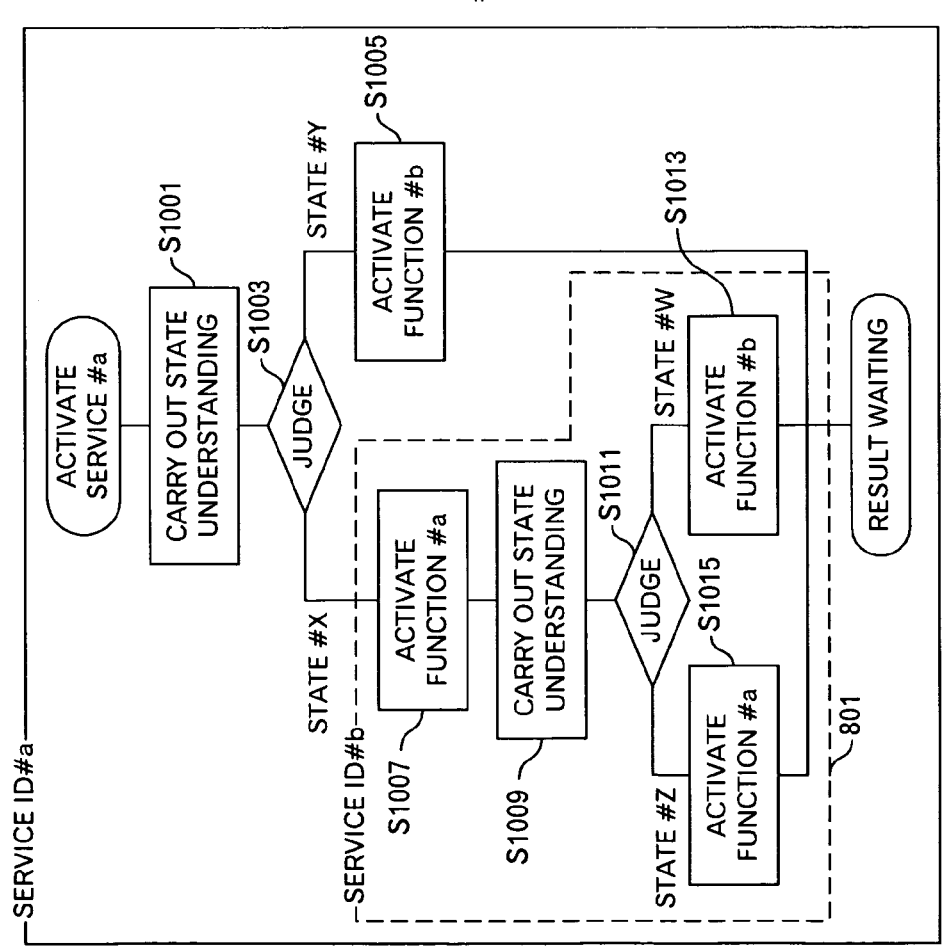

Here, the explanation for the service program will be added. The service program can be freely constructed as far as the function modules whose uses are allowed for the client causing the service program to be executed are used. As shown FIG. 8A, a service #a is defined as follows: first, a state understanding (for example, activation of a function module #c) is carried out (step S1001), it is judged whether the state as a result of the state understanding is either a state #X or a state #Y (step S1003), in a case of the state #Y, a function module #b is activated (step S1005), and after that, the processing shits to a waiting state for the result, or in a case of the state #X, a function module #a is activated (step S1007), the state understanding is further carried out (for example, activation of the function module #c) (step S1009), it is judged whether the state as a result of the state understanding is either a state #Z or a state #W, and in a case of the state #Z, the function module #a is activated, and after that, the processing shifts to a waiting state for the result, and in a case of the state #W, the function module #b is activated (step S1013), and after that, the processing shifts to a waiting state for the result. As stated above, it is possible to carry out all settings for necessary function utilization and necessary parameters, and it is also possible to define the activation of a service #b (step S1021) in the service #a as shown in FIG. 8B instead of the block 801 in FIG. 8A when the service #b is separately defined for the steps S1007 to S1015.

Figure 9:
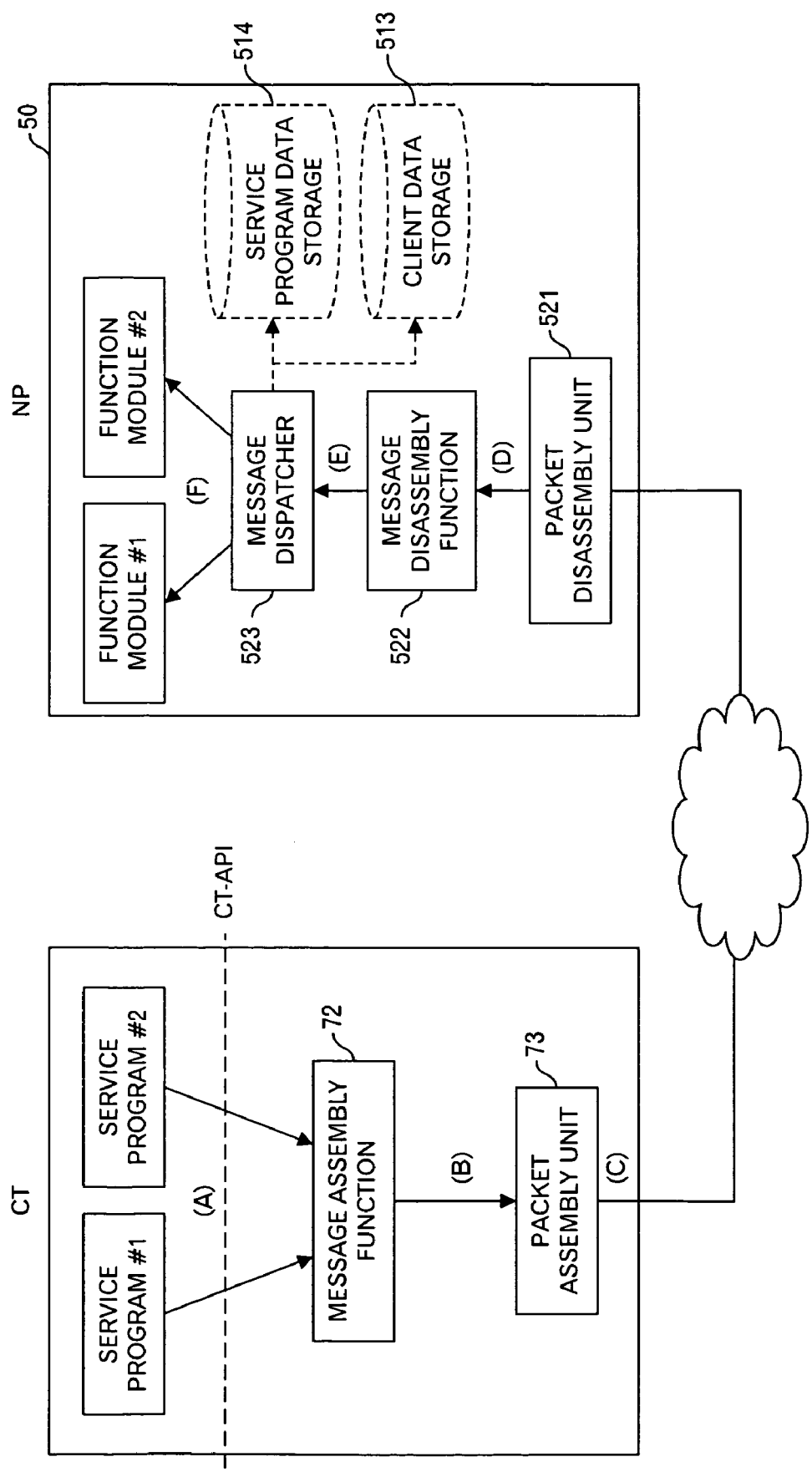
FIG. 9 is a diagram showing an outline of a processing of data transmitted to the network platform from the client terminal.
Figure 10A:
FIGS. 10A to 10F are diagrams showing examples of data at respective stages.
Figure 10B:
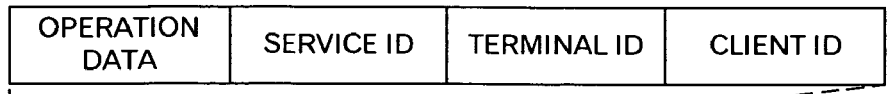
Figure 10C:

Next, an assembly method, a disassembly method and distribution method for a message and a packet in this embodiment will be explained with reference to FIGS. 9 to 12. Incidentally, the communication through SCI will be explained. As shown in FIG. 9, when a service program #1 or a service program #2 generates operation data (for example, an activation request of a specific function module and a necessary parameter), the service program #1 or the service program #2 outputs the operation data to a message assembly function module 72. The data outputted to the message assembly function module 72 is data as shown in FIG. 10A. Although the data is basically only the operation data, there is also a case where a service ID, together with the operation data, is outputted in order to distinguish the service program. The message assembly function module 72 further adds a terminal ID and a client ID and outputs them to a packet assembly unit 73. That is, data as shown in FIG. 10B is constructed as a message. Incidentally, an interface between the message assembly function module 72 and the packet assembly unit 73 is a normal communication interface, and the packet assembly unit 73 adds a packet header including, for example, a network address in accordance with a specific communication protocol. Data as shown in FIG. 10C is generated.

Figure 10D:
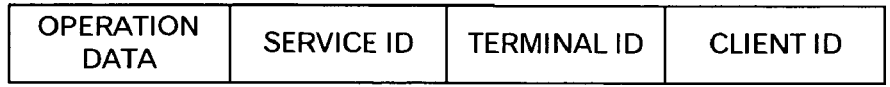

Next, in the network platform 50, a packet disassembly unit 521 receives the packet from the client terminal in accordance with the specific communication protocol, extracts a message (operation data, service ID, terminal ID, and client ID) included in the packet, and outputs it to a message disassembly function module 522 through a communication interface. The message is data as shown in FIG. 10D. When receiving the message, the message disassembly function module 522 disassembles the client ID, the terminal ID, the service ID and the operation data, and outputs the client ID, the terminal ID, and the service ID to the authentication and authorization function module 501 and the billing function module 502. Incidentally, for sending back a response, there is also a case where the packet disassembly unit 521 outputs the network address included in the packet header to the message disassembly function module 522, and the message disassembly function module 522 stores the network address into the storage device so as to correspond to the client ID, the terminal ID or the service ID.

The authentication and authorization function module 501 refers to the client data storage 513, and uses the client ID and the service ID to perform the service authorization. Incidentally, like the related art, it is judged by the client ID and the terminal ID whether the network platform 50 can be used, and personal authentication is separately performed by the data such as the client ID and password. The billing function module 502 mainly uses the client ID to carry out the billing processing. Incidentally, there is also a case where the service ID and the like are further used to carry out the billing processing. Then, in the case where the fee varies according to each function to be used, the function used is specified from the service ID, the usage state for each function is specified to carry out the billing. Incidentally, with respect to the terminal ID, since the same ID is given to plural terminals, and it is possible to specify from the terminal ID that a terminal belongs to a specific group, there is also a case where the terminal ID is also used for billing at the time when a certain user group shares terminals. Further, in the case of a public terminal or the like, which is assumed to be used by many and unspecified users, it may be judged by using the terminal ID whether the provision of a service defined by a client is authorized. For example, in a case where it is desired that the use of the public terminal is limited to a specific service provision, it is also possible to carry out only a service, that is, only a service program for the terminal ID.

Incidentally, the authentication and authorization function module 501 further refers to the client data storage 513, and on the basis of the correspondence between the client ID and the IDs of the authorized function modules as shown in FIG. 6, it may judge whether the function module to be activated, which is designated in the operation data, can be used. At this time, the function module may be specified by the authentication and authorization function module 501, or may be performed by a message dispatcher 523 described below. Alternatively, there is also a case where a judgment is made from, not the data as shown in FIG. 6, but a correspondence between the client ID and the registered service programs or an ID group of all function modules defined in the registered service programs.

Figure 10E:
Figure 10F:

When the service authorization by the client ID and the service ID is obtained, as shown in FIGS. 10E and 10F, the message disassembly function module 522 outputs only the operation data or the operation data and the service ID to the message dispatcher 523. The message dispatcher 523 analyzes the operation data, specifies the function module of the output destination, and outputs the operation data to the function module. As shown in FIGS. 10E and 10F, at this time, there is also a case where the message dispatcher 523 adds the service ID and outputs it in order to recognize that the request is from which service program.

Incidentally, the message dispatcher 523 may refer to the client data storage 513 (FIG. 6 and the like), and judge whether the function module to be utilized, which is designated in the operation data, can be used. In addition, although the operation data basically includes designation of the function module to be used (that is, activated), only necessary parameters may be included while the designation of the function module is not included. In such a case, for example, a correspondence between a client ID and a service ID and a service program itself or an ID group of all function modules defined in the service program may be registered in the service program data storage 514, the state in the service program identified by the client ID and the service ID may be specified by the parameters included in the operation data, and the function module to which the parameters are outputted may be specified according to the state in the service program.

In this way, the request of the service program in the client terminal is transmitted to the suitable function module in the network platform 50.

Next, a processing in a case where a response is sent back from the network platform 50 to the client terminal will be described with reference to FIG. 11. First, a function module #1 or a function module #2 n the network platform 50 outputs operation data (i.e. processing result) or operation data and a service ID to a message assembly function module 524. The data to be outputted is the same as that of FIG. 10A. The message assembly function module 524 specifies a requesting client, adds a terminal ID and a client ID to construct a message, and outputs it to a packet assembly unit 525. The constructed message is the data as shown in FIG. 10B. The requesting client is specified in conjunction with the message disassembly function module 522 and the message dispatcher 523 of FIG. 9, or by using the client data storage 513, which stores the data shown in FIG. 7 and the terminal ID and the like associated with the client ID. The packet assembly unit 525 generates a packet including a packet header including a network address corresponding to the client ID or the terminal ID, and transmits it to the client terminal. The packet to be transmitted is similar to that of FIG. 10C.

In the client terminal, when receiving the packet as shown in FIG. 10C, a packet disassembly unit 74 removes the packet header, and outputs a message portion to a message disassembly function module 75. The structure of the message portion is similar to that of FIG. 10D. The message disassembly function module 75 extracts the operation data included in the message, or the operation data and the service ID, and outputs them to a message dispatcher 76. The data outputted at this stage is similar to that of FIG. 10E or 10F. The message dispatcher 76 outputs the operation data or the operation data and the service ID to the service program #1 or the service program #2 in accordance with the analysis result of the operation data or in accordance with the service ID.

By carrying out the processing as stated above, the operation data is suitably exchanged between the client terminal and the network platform. Incidentally, because the network address and the function module are not directly correlated with each other, there is also a merit that it is unnecessary to take the trouble to notify the client terminals of the addition and modification of the function modules in the network platform 50.

Figure 11:
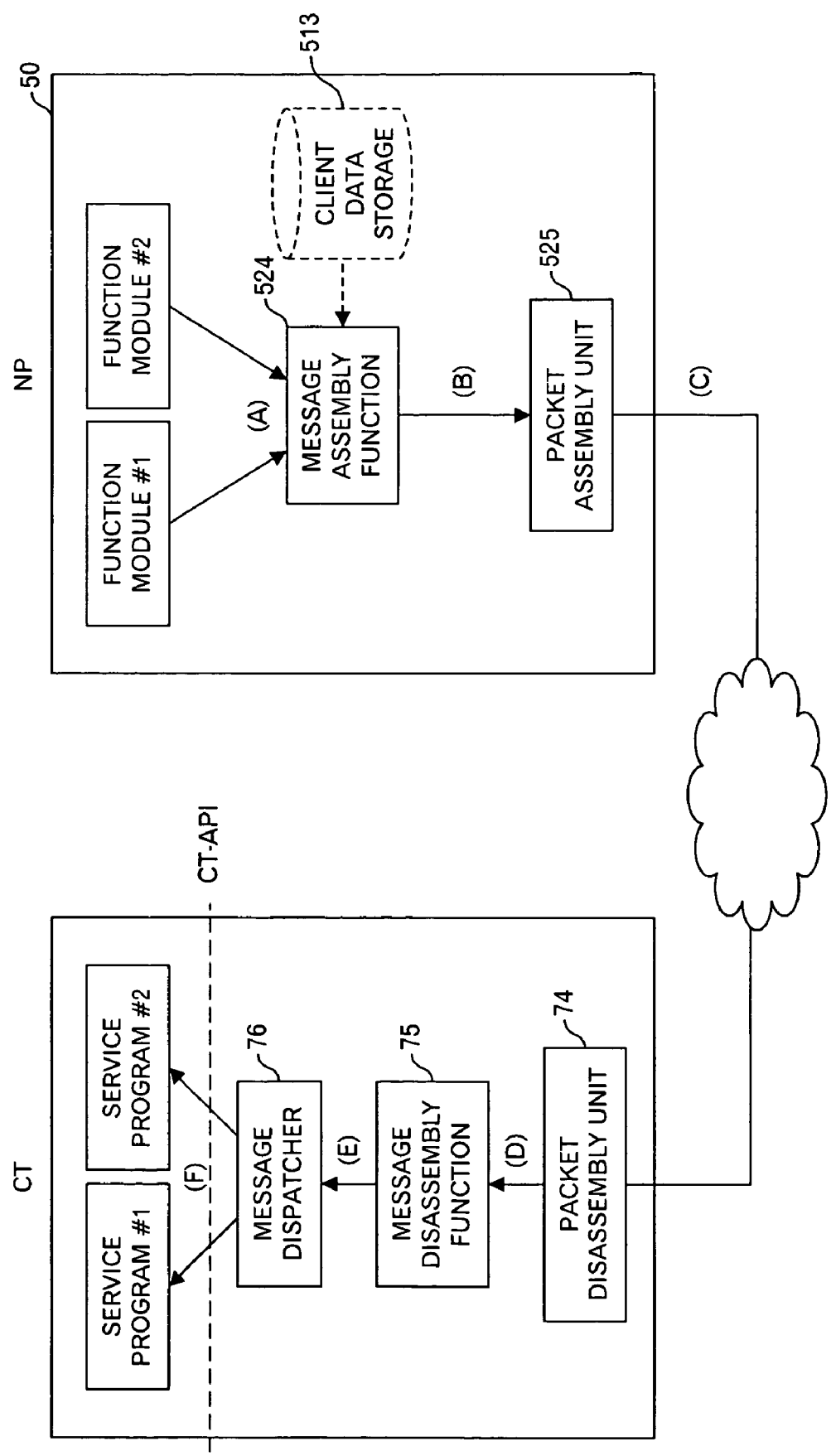
FIG. 11 is a diagram showing an outline of a processing of data transmitted to the client terminal from the network platform.
Figure 12:
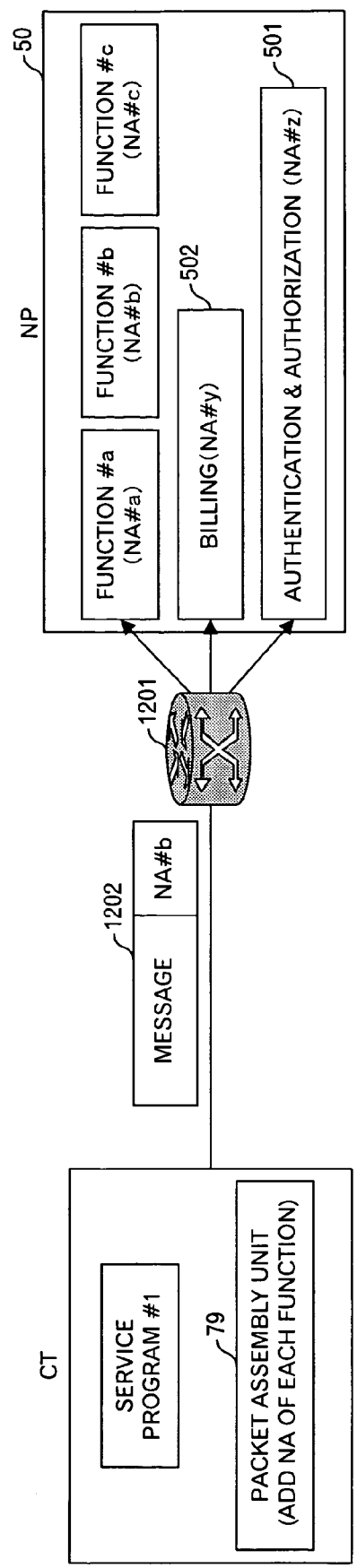
FIG. 12 is a diagram showing another example of FIG. 9.

Incidentally, in FIGS. 9 to 11, one network address is assigned to the network platform 50, and the disassembly and distribution of the message are carried out in the network platform 50. However, as shown in FIG. 12, it is possible to configure such that a network address (NA) is assigned to each function module in the network platform 50, the packet assembly unit 79 of the client terminal adds a packet header including NA of the function module (here, function module #b) of a message destination to the message to construct a packet 1202, and a network apparatus 1201 transfers the packet 1202 to the designated function module (here, #b) in the network platform 50 based on the destination network address of the packet 1202. Incidentally, because it is necessary to carry out processings such as the billing and the authentication and authorization, there is a case where the packet 1202 is copied and transferred to the authentication and authorization function module 501 and the billing function module 502.

Figure 13:
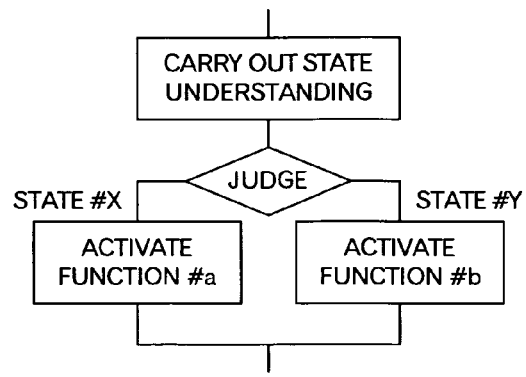
FIG. 13 is a diagram showing an example of the service program.
Figure 14:
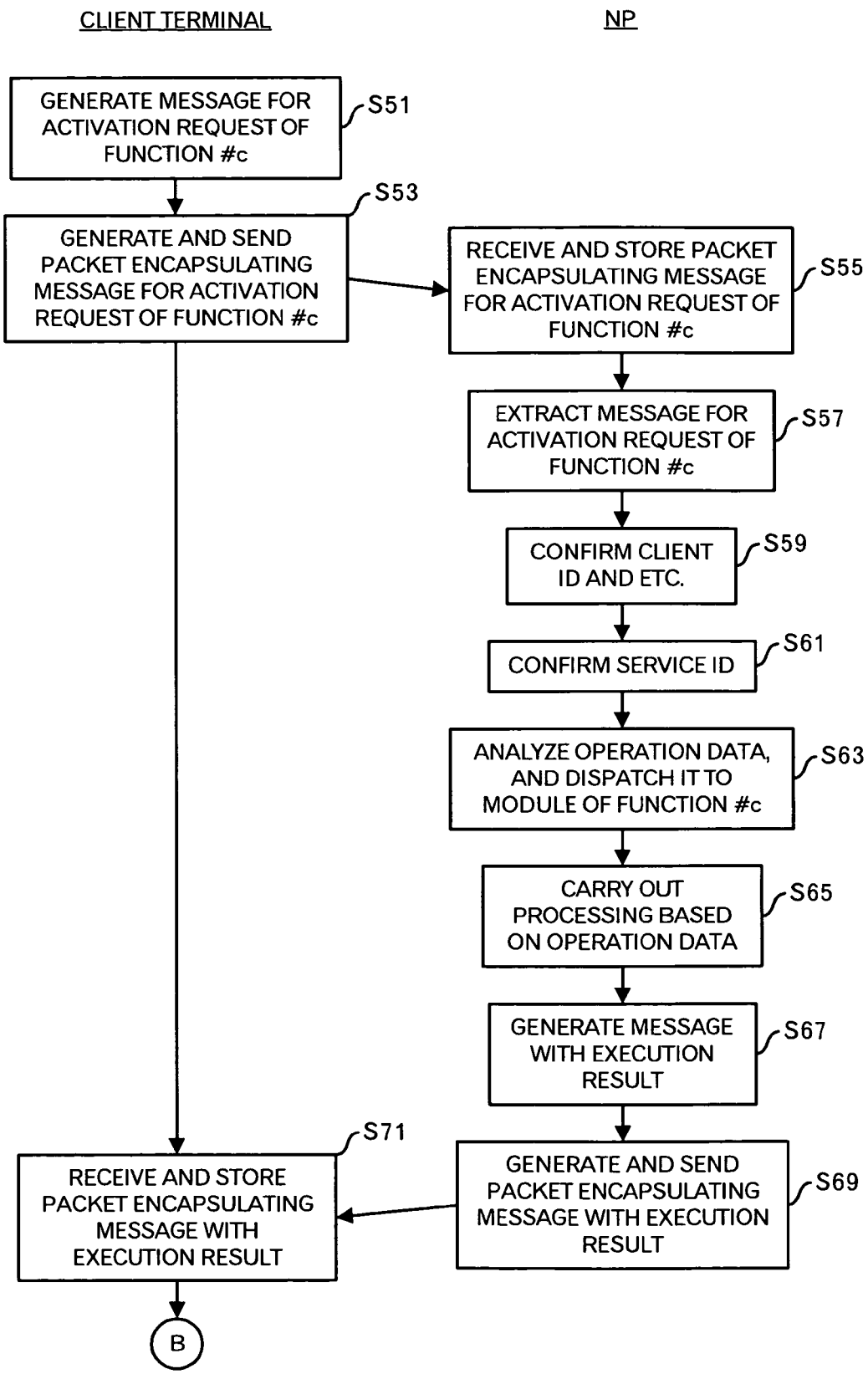
FIG. 14 is a diagram showing a processing flow at a time when a service is used through the SCI.
Figure 16:
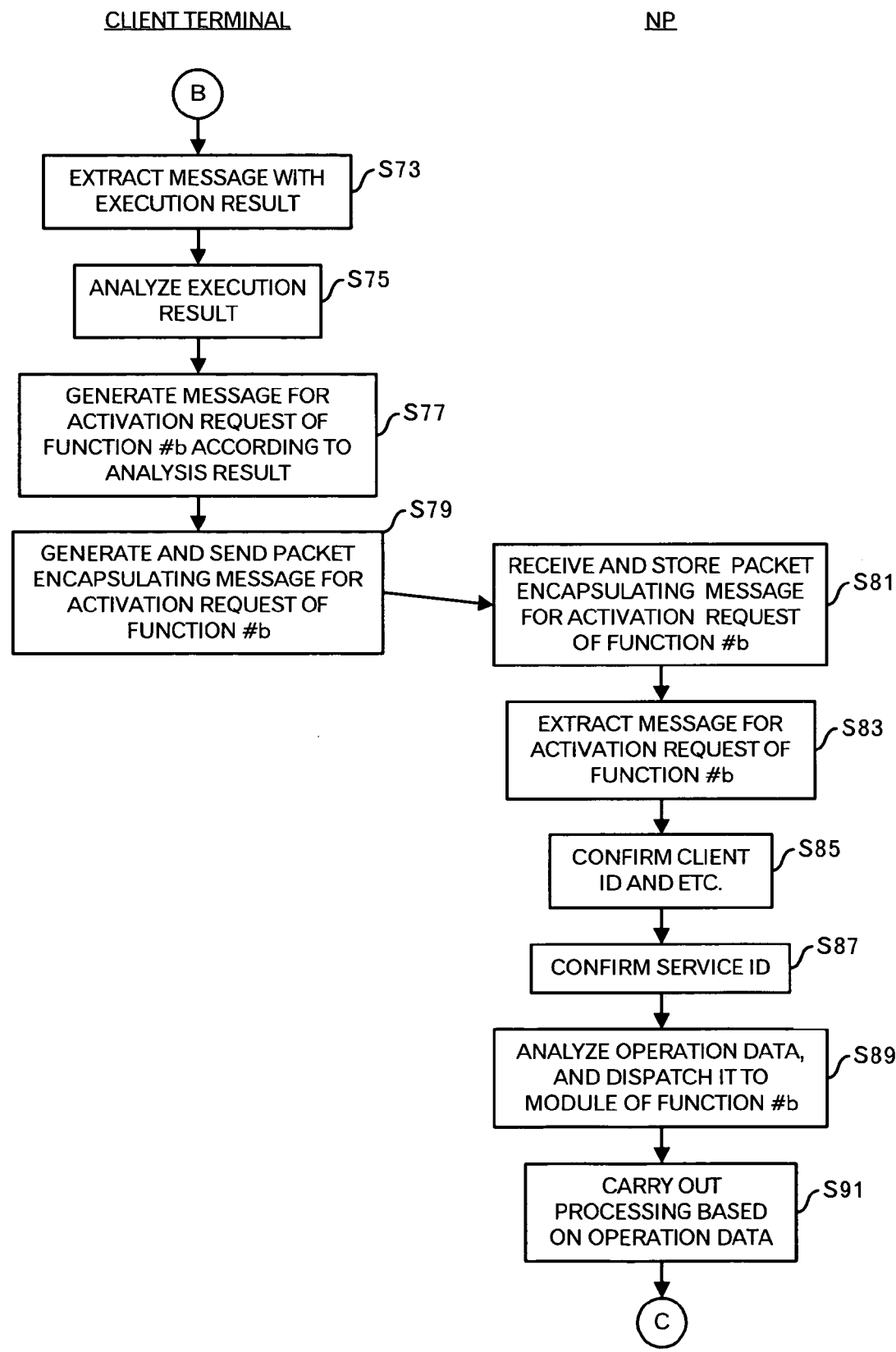
FIG. 16 is a diagram showing a processing flow at the time when the service is used through the SCI.
Figure 17:
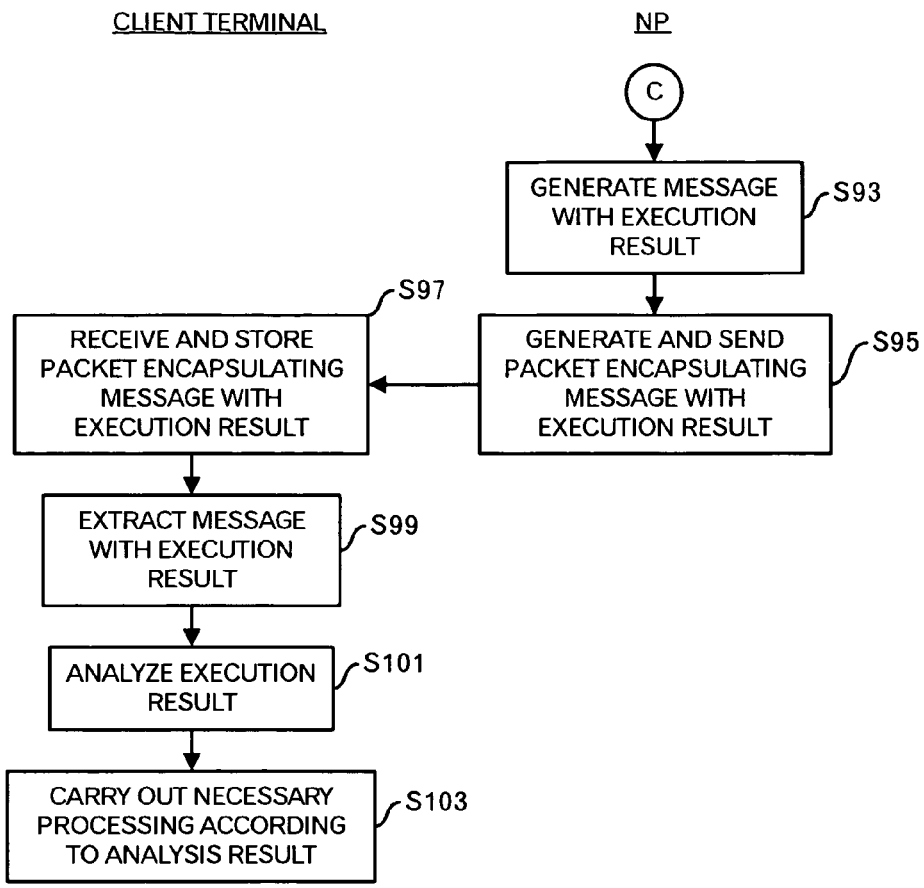
FIG. 17 is a diagram showing a processing flow at the time when the service is used through the SCI.

Next, on the premise of the assembly, disassembly and distribution method of the message and the packet shown in FIGS. 9 to 12, a description will be given to a specific processing flow for the message exchange with reference to FIGS. 13 to 17. Here, it is assumed that for example, in the service program #1 of the client terminal 7, the logic as shown in FIG. 13 is defined. In an example of this service program, it is assumed that, in order that the user of the client terminal 7 carries out advertisement delivery, first, an inquiry for the state of the delivery destination is carried out (i.e. state understanding), and then, the advertisement is delivered by different delivery methods according to the state of the delivery destinations. That is, it is assumed that a service program #1 is defined such that, first, as a state understanding for a specific terminal (or user), an inquiry is made to a context management function module #c, a state judgment is made on the basis of a response to the inquiry, and when the state of the specific terminal is a state #X, a function module #a is activated, and when it is a state #Y, a function module #b is activated. Besides, it is assumed that a service ID is #0703, a terminal ID is #936, and a client ID is #531.

Then, the service program #1 or the like of the client terminal 7 generates an activation request message of the function module #c in order to carry out the state understanding for the specific terminal, and stores it into the storage device such as a main memory (step S51). The activation request message includes a client ID "#531", a terminal ID "#936", a service ID "#0703", an activation request of the function module #c, and identification information of the specific terminal (or identification information of a specific user). The packet assembly unit 73 of the client terminal 7 generates a packet encapsulating the generated activation request message and a destination network address, and transmits it to the network platform 50 (step S53). For example, a packet as shown in FIG. 15A is generated and is transmitted.

On the other hand, the packet disassembly unit 521 of the network platform 50 receives the packet encapsulating the message for the activation request of the function module #c from the client terminal 7, and stores the message into the storage device (step S55). Then, it extracts the message for the activation request of the function module #c from the packet (step S57). Besides, also as described above, the message disassembly function module 522 extracts the client ID, the terminal ID, and the service ID included in the activation request message, and outputs them to the authentication and authorization function module 501 and the billing function module 502. The authentication and authorization function module 501 confirms the client ID and the terminal ID, and the billing function module 502 performs a billing processing (step S59). Further, the authentication and authorization function module 501 uses the service ID and the client ID to confirm whether the activation request of the function module #c can be authorized (step S61). In the case where a problem is detected at the step S59 or S61, a message that the requested processing cannot be carried out is sent back to the client terminal 7. On the other hand, in the case where a problem is not detected at the steps S59 and S61, the operation data (here, the activation request of the function module #c and parameters) or the operation data and the service ID are outputted from the message disassembly function module 522 to the message dispatcher 523. The message dispatcher 523 analyzes the operation data, and dispatches the operation data to the function module #c (step S63). Incidentally, in the case of the activation, necessary parameters are transferred to activate the function module.

Although described above, before the function module #c is activated, a judgment may be made as to whether or not the function module #c itself can be used (i.e. activated). In this case, a judgment may be made by referring to the data as shown in FIG. 6, which is stored in the client data storage 513, and further, as described above, a judgment may be made by referring to the correspondence, stored in the service program data storage 514, between the client ID and the service program itself or the ID group of the function modules defined in the service program.

The function module #c carries out a processing on the basis of the operation data (step S65), generates the operation data including the execution result (here, "function #c execution result: state Y" (for example, user A has a cellular phone and is on a train)), and outputs the operation data or the operation data and the service ID to the message assembly function module 524. The message assembly function module 524 adds the client ID "#531", the terminal ID "#936" and the service ID "#0703" to generate a message (step S67). The packet assembly unit 525 adds the packet header to the message including the execution result to generate the packet, and transmits it to the client terminal 7 (step S69). The packet transmitted at this step is, for example, a packet as shown in FIG. 15B.

The packet disassembly unit 74 of the client terminal 7 receives the packet including the execution result message from the network platform 50, and stores it into the storage device such as, for example, the main memory (step S71). The processing proceeds to FIG. 16 through a terminal B. Then, the packet disassembly unit 74 extracts the execution result message portion, and outputs it to the message disassembly function module 75 (step S73). The message disassembly function module 75 extracts the operation data including the execution result or the operation data and the service ID from the execution result message, and outputs them to the message dispatcher 76. The message dispatcher 76 outputs the operation data to the service program #1 as the requester of the operation data.

The service program #1 analyzes the execution result included in the operation data, and judges the state when it is the service program as shown in FIG. 13 (step S75). In the example of FIG. 15B, because it is understood that the state is the state #Y, the function module #b should be activated. For example, SIP is used to call via VoIP (Voice Over IP). Accordingly, the service program #1 generates a message for the activation request of the function module #b in accordance with the analysis result (step S77), and stores it into the storage device such as the main memory. The message for the activation request includes the client ID "#531", the terminal ID "#936", the service ID "#0703 ", the activation request of the function module #b, and a parameter of the calling destination SIP-URL. The packet assembly unit 73 of the client terminal 7 generates a packet encapsulating the generated message for the activation request and the destination network address, and transmits it to the network platform 50 (step S79). For example, the packet as shown in FIG. 15C is generated and is transmitted.

On the other hand, the packet disassembly unit 521 of the network platform 50 receives the packet encapsulating the message for the activation request of the function module #b from the client terminal 7, and stores the message into the storage device (step S81). Then, it extracts the message for the activation request of the function module #b from the packet (step S83). Besides, also as described above, the message disassembly function module 522 extracts the client ID, the terminal ID, and the service ID included in the message for the activation request, and outputs them to the authentication and authorization function module 501 and the billing function module 502. The authentication and authorization function module 501 confirms the client ID and the terminal ID, and the billing function module 502 carries out the billing processing (step S85). Further, the authentication and authorization function module 501 uses the service ID and the client ID, and confirms whether the activation request of the function module #b can be authorized (step S87). In the case where a problem is detected at the step S85 or S87, a message that the requested processing cannot be carried out is sent back to the client terminal 7. On the other hand, in the case where a problem is not detected at the step S85 and S87, the operation data (here, the activation request of the function module #b and parameters) or the operation data and the service ID are outputted from the message disassembly function module 522 to the message dispatcher 523. The message dispatcher 523 analyzes the operation data, and dispatches the operation data to the function module #b (step S89). Incidentally, in the case of the activation, necessary parameters are transferred to activate the function module #b. Also as described above, a judgment may be made at this state as to whether the function can be activated.

The function module #b carries out the processing on the basis of the operation data (step S91), generates the operation data including the execution result (here, "execution result of the function #b"), and outputs the operation data or the operation data and the service ID to the message assembly function module 524. The processing proceeds to the processing of FIG. 17 through a terminal C.

Then, the message assembly function module 524 adds the client ID "#531", the terminal ID "#936" and the service ID "#0703" to generate a message (step S93). The packet assembly unit 525 adds a packet header to the message including the execution result to generate a packet, and transmits it to the client terminal 7 (step S95). The packet to be transmitted at this step is, for example, a packet as shown in FIG. 15D.

The packet disassembly unit 74 of the client terminal 7 receives the packet including the execution result message from the network platform 50, and stores it into the storage device such as, for example, the main memory (step S97). Then, the packet disassembly unit 74 extracts the execution result message portion, and outputs it to the message disassembly function module 75 (step S99). The message disassembly function module 75 extracts the operation data including the execution result or the operation data and the service ID from the execution result message, and outputs it to the message dispatcher 76. The message dispatcher 76 outputs the operation data to the service program #1 as the requester of the operation data.

The service program #1 analyzes the execution result included in the operation data (step S101), and performs a necessary processing in accordance with the analysis result (step S103).

As stated above, the message added with the service ID is exchanged, and the processing is performed in accordance with the service program.

In addition, as stated above, various APIs are prepared for the provision of network services, and the user of the client terminal or the software developer can generate a service program in which the function modules are combined to use as the need arises. In addition, it is possible to store the service program not only in the client terminal, but also on a network such as the network platform 50 side, and accordingly, it is also possible for the user to download it as needs arise and utilize a predetermined service by using another terminal like by using his or her own terminal. Further, in the case where a specific service is used, it is sufficient if only the service program is prepared. Thus, as compared with a case where the whole of the specific service is systemized, the number of development steps and the period can be decreased. Besides, the update of the service program itself is easy, and when the function module at the network platform 50 side is updated, all clients can use the improved function. Further, because the function module can be downloaded to the client terminal as the need arises, even in the terminal not having many functions originally, various and high-level services can be used.

In addition, because the messages (the packet on the network) including the service ID are exchanged in this embodiment, the client terminal can simultaneously execute the plural service programs. That is, it is possible to identify the service program for which the message is received, and the service program for which the processing is being carried out.

Furthermore, when the service program or states defined by the service program is managed at the network platform 50 side, it becomes possible to determine to which function module the operation data should be dispatched, by referring to the service ID. Further, when it is judged at the network platform 50 side whether or not the function is authorized, at a time when the service program is registered, and the service ID is assigned when the utilization is allowed, it becomes possible to judge by the service ID, whether or not the function is authorized, after that. That is, it is unnecessary to judge whether or not the function is authorized for each message, and because it is possible for the network platform 50 side to carry out the service authorization only by checking the corresponding table of the service ID and the client ID, the processing is simplified.

Although the embodiment of the invention has been described, the invention is not limited to this. For example, although the generation processing of the service program through the SMI has been described, when the details of function modules provided in the network platform 50 can be separately obtained, the service program may be generated on the basis of the separately obtained information. Besides, also with respect to the registration of the service program, there is also a case where a procedure of separately performing confirmation and registration without using the network is adopted.

Besides, there is also a case where the network platform 50 is not realized by one computer, and the functions are shared by plural computers, or parallel or distributed processing is carried out for portion of the functions.

Besides, with respect to the service authorization, there is also a case where other data (for example, data (hash value or electronic certificate) to prove that alteration of the service program is not made) is added to confirm it in the network platform 50.

Further, clients who can use a function module may be defined for each of the functional modules in the network platform 50, and by using the client ID and the function module ID included in the operation data, a judgment may be made for each of the function modules as to whether or not the function module can be used. Besides, by using only the corresponding table between the client ID and the function module ID as shown in FIG. 8, a judgment may be made as to whether or not the function module can be used.

Figure 18:
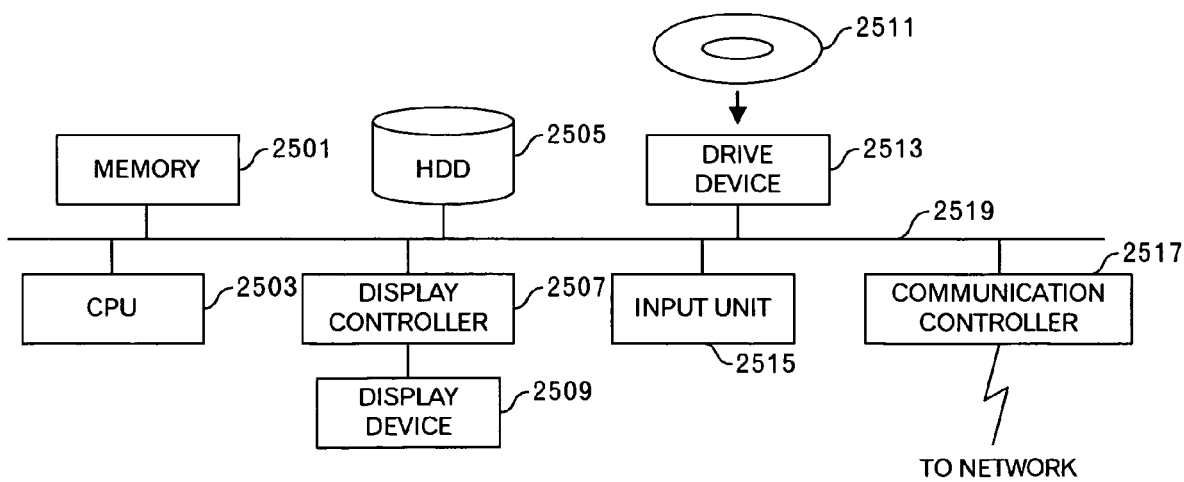
FIG. 18 is a functional block diagram of a computer.

Incidentally, one or plural computers to achieve the network platform 50 and the client terminal are computer devices shown in FIG. 18. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A service processing method, comprising:
   receiving from a client terminal executing a service program that specifies how to combine and execute functions authorized for a client side, among functions provided by a network platform side, and whose identification information is registered in said network platform side, a message including identification information of said service program, identification information of a client, and description of a requested operation for a specific function;
   referring to a data storage storing said identification information of said service program in association with said identification information of said client to confirm whether or not a combination of said identification information of said service program and said identification information of said client, which are included in the received message, has been registered in said data storage; and
   if the confirmation in said referring is affirmative, carrying out a processing requested in said message by said specific function in said network platform side, and transmitting a response including a processing result and said identification information of said service program to said client terminal.

2. The service processing method as set forth in claim 1, further comprising:
   receiving from said client terminal, a service program registration request including a service program that has not been registered in said network platform side, and said identification information of said client;
   analyzing the received service program to judge whether or not all functions to be used in the received service program are authorized for said client;
   if it is judged that said all functions to be used in the received service program are authorized for said client, storing identification information issued for the received service program in association with said identification information of said client; and
   transmitting a registration completion notification including said identification information of said service program to said client terminal.

3. The service processing method as set forth in claim 2, wherein said analyzing comprises searching a client data storage storing identification information of an authorized function in association with said identification information of said client by using said identification information of said client, which is included in said service program registration request, and judging whether or not all functions to be used in the received service program can be extracted from said client data storage.

4. The service processing method as set forth in claim 1, wherein said message includes a parameter necessary in said specific function in said network platform side.

5. The service processing method as set forth in claim 4, further comprising identifying said specific function in said network platform side by using said identification information of said service program, which is included in said message, and a held processing state of a service request from said service program.

6. The service processing method as set forth in claim 1, wherein said message includes description of a specific function in said network platform side and a parameter necessary in said specific function.

7. The service processing method as set forth in claim 6, further comprising judging whether or not said specific function in said network platform side, which is designated in said message, is authorized.

8. The service processing method as set forth in claim 1, wherein there are a plurality of functions provided in said network platform side, and each of said plurality of functions is realized in any one of a plurality of computers connected via a network each other, and said message includes a network address of a computer realizing said specific function in said network platform side.

9. The service processing method as set forth in claim 1, wherein there are a plurality of functions provided in said network platform side, and each of said plurality of functions is realized in any one of a plurality of computers connected via a network each other, and said service processing method further comprises specifying a computer realizing said specific function in said network platform side, which is requested in said message, and requesting a processing by said specific function of the specified computer.

10. An information processing method, comprising:
    receiving a service program registration request including a service program in which how to combine and execute certain functions among functions provided by a network platform side is specified by a client, and identification information of said client;
    analyzing the received service program to judge whether or not all functions to be used in the received service program are authorized by said client;
    if it is judged that said all functions to be used in the received service program are authorized by said client, storing identification information issued for the received service program in association with said identification information of said client; and
    transmitting a registration completion notice including said identification information of said service program to said client terminal.

11. The information processing method as set forth in claim 10, wherein said identification information of said service program is issued in said network platform or in said client side.

12. The information processing method as set forth in claim 10, further comprising: if it is judged that said all functions to be used in said service program is authorized by said client, storing identification information of functions judged to be authorized in association with said identification information of said service program into a second data storage.

13. A computer-readable storage medium storing a program, which when executed by a computer, causes the computer to carry to carry out a method, the method comprising:
    receiving from a client terminal executing a service program that specifies how to combine and execute functions authorized for a client side, among functions provided by a network platform side, and whose identification information is registered in the network platform side, a message including identification information of said service program, identification information of a client, and description of a requested operation for a specific function;

referring to a data storage storing said identification information of said service program in association with said identification information of said client to confirm whether or not a combination of said identification information of said service program and said identification information of said client, which are included in the received message, has been registered in said data storage; and if the confirmation in said referring is affirmative, carrying out a processing requested in said message by said specific function in said network platform side, and transmitting a response including a processing result and said identification information of said service program to said client terminal.

14. A computer-readable storage medium storing a program, which when executed by a computer, causes the computer to perform a method, the method comprising:

receiving a service program registration request including a service program in which how to combine and execute certain functions among functions provided by a network platform side is specified by a client, and identification information of said client;

analyzing the received service program to judge whether or not all functions to be used in the received service program are authorized for said client;

if it is judged that said all functions to be used in the received service program are authorized for said client, storing identification information issued for the received service program in association with said identification information of said client; and transmitting a registration completion notice including said identification information of said service program to said client terminal.

15. A service processing apparatus, comprising:

a unit to receive from a client terminal executing a service program that specifies how to combine and execute functions authorized for a client side, among functions provided by a network platform side, and whose identification information is registered in said network platform side, a message including identification information of said service program, identification information of a client, and description of a requested operation for a specific function;

a unit to refer to a data storage storing said identification information of said service program in association with said identification information of said client to confirm whether or not a combination of said identification information of said service program and said identification information of said client, which are included in the received message, has been registered in said data storage; and a unit to carry out a processing requested in said message by said specific function in said network platform side, and transmit a response including a processing result and said identification information of said service program to said client terminal, if the confirmation in said referring is affirmative.

16. An information processing apparatus, comprising: a unit to receive a service program registration request including a service program in which how to combine and execute certain functions among functions provided by a network platform side is specified by a client, and identification information of said client;

a unit to analyze the received service program to judge whether or not all functions to be used in the received service program are authorized for said client;

a unit to store identification information issued for the received service program in association with said identification information of said client, if it is judged that said all functions to be used in the received service program are authorized for said client; and a unit to transmit a registration completion notice including said identification information of said service program to said client terminal.

* * * * *